US008967966B2

(12) United States Patent
Boston et al.

(10) Patent No.: US 8,967,966 B2
(45) Date of Patent: Mar. 3, 2015

(54) HUB FOR A PROPELLER HAVING VARIABLE PITCH BLADES

(75) Inventors: Eric Jacques Boston, Cesson (FR); Michel André Bouru, Montereau sur le Jard (FR); Laurent Jablonski, Melun (FR); Philippe Gérard Edmond Joly, Vaux le Penil (FR)

(73) Assignee: SNECMA, Paris (FR)

( * ) Notice: Subject to any disclaimer, the term of this patent is extended or adjusted under 35 U.S.C. 154(b) by 357 days.

(21) Appl. No.: 13/389,031

(22) PCT Filed: Jul. 23, 2010

(86) PCT No.: PCT/EP2010/060743
§ 371 (c)(1),
(2), (4) Date: Feb. 6, 2012

(87) PCT Pub. No.: WO2011/015475
PCT Pub. Date: Feb. 10, 2011

(65) Prior Publication Data
US 2012/0134822 A1 May 31, 2012

(30) Foreign Application Priority Data

Aug. 5, 2009 (FR) ...................................... 09 55516

(51) Int. Cl.
*F04D 29/32* (2006.01)
*F01D 5/02* (2006.01)
(Continued)

(52) U.S. Cl.
CPC ............. *F04D 29/321* (2013.01); *B64C 11/02* (2013.01); *B64C 11/48* (2013.01); *F01D 1/26* (2013.01);
(Continued)

(58) Field of Classification Search
USPC ................. 415/9, 66, 68, 69; 416/2, 124, 126, 416/128–130, 147, 204 A, 244 R, 244 A, 174
See application file for complete search history.

(56) References Cited

U.S. PATENT DOCUMENTS 3,165,294 A * 1/1965 Anderson .................. 416/220 R
5,224,831 A 7/1993 Hermans et al.
(Continued)

FOREIGN PATENT DOCUMENTS

FR 2 641 251 7/1990

OTHER PUBLICATIONS

International Search Report Issued Oct. 28, 2010 in PCT/EP10/60743 Filed Jul. 23, 2010.
(Continued)

*Primary Examiner* — Christopher Verdier
(74) *Attorney, Agent, or Firm* — Oblon, McClelland, Maier & Neustadt, L.L.P.

(57) ABSTRACT

A hub for a propeller having variable pitch blades for a turbine engine, for example for a propfan turbine engine. The propeller hub includes: a polygonal ring having substantially radial cylindrical housings distributed about a central axis of the ring for receiving the blades; a rotor element for the turbine of the turbine engine; a supporting flange attached to the ring so as to connect the ring to the rotor element; and a plurality of backup retaining members linked to the rotor element, and each of which includes at least one bearing surface opposite an outer surface of the ring with a radial spacing.

7 Claims, 2 Drawing Sheets

(51) Int. Cl.

| | | |
|---|---|---|
| *F01D 21/04* | (2006.01) | |
| *B64C 11/02* | (2006.01) | |
| *B64C 11/48* | (2006.01) | |
| *F01D 1/26* | (2006.01) | |
| *F01D 5/30* | (2006.01) | |
| *F01D 7/00* | (2006.01) | |
| *F01D 7/02* | (2006.01) | |
| *F02C 6/20* | (2006.01) | |
| *F02C 9/58* | (2006.01) | |
| *B64D 27/02* | (2006.01) | |

(52) U.S. Cl.
CPC .............. *F01D 5/025* (2013.01); *F01D 5/3007* (2013.01); *F01D 7/00* (2013.01); *F01D 7/02* (2013.01); *F02C 6/206* (2013.01); *F02C 9/58* (2013.01); *B64D 2027/026* (2013.01); *Y02T 50/66* (2013.01); *F05D 2220/325* (2013.01); *F05D 2260/74* (2013.01); *F05D 2260/79* (2013.01); *Y02T 50/671* (2013.01)
USPC ...... 416/2; 415/9; 415/68; 471/129; 471/147; 471/204 A; 471/244 A; 471/174

(56) References Cited

U.S. PATENT DOCUMENTS

| | | |
|---|---|---|
| 5,713,721 A | 2/1998 | Glynn et al. |
| 2006/0018756 A1* | 1/2006 | Schroder ................. 416/219 R |
| 2010/0239421 A1 | 9/2010 | Boston et al. |
| 2012/0045334 A1 | 2/2012 | Bouru et al. |

OTHER PUBLICATIONS

U.S. Appl. No. 13/382,026, filed Jan. 3, 2014, Boston, et al.

* cited by examiner

US 8,967,966 B2

HUB FOR A PROPELLER HAVING VARIABLE PITCH BLADES

BACKGROUND OF THE INVENTION

1. Field of the Invention

The present invention concerns a hub for a propeller with variable pitch blades for a turbomachine of the unducted fan or open rotor type.

2. Description of the Related Art

The fan of a turbomachine of this type typically comprises coaxial external upstream and downstream contrarotating propellers each driven in rotation by a turbine of the turbomachine and extending substantially radially outside the nacelle of the turbomachine.

Each propeller comprises a hub including a rotor element of the turbine and a polygonal ring fixed to said rotor element and having substantially radial cylindrical housings distributed around the longitudinal axis of the turbomachine and receiving the blades of the propeller.

The blades may turn in the housings of the polygonal ring and are driven in rotation about the axes of the blades by appropriate means to adjust the angular pitch of the blades to optimize it as a function of the operating conditions of the turbomachine.

In operation, the blades of the propeller are subjected to very high centrifugal forces, as high as 30 000 daN, which forces are transmitted to the polygonal ring. In the event of fracture of the polygonal ring, the blades could escape, causing very extensive structural damage around the turbomachine.

BRIEF SUMMARY OF THE INVENTION

A notable aim of the invention is to provide a simple, effective and economic solution to this problem.

Its subject matter is a propeller hub of the aforementioned type incorporating a safety measure against failure of the polygonal ring.

To this end it proposes a propeller hub for a turbomachine with variable pitch blades, the hub including a turbomachine turbine rotor element, a polygonal ring fixed to said rotor element and having substantially radial cylindrical housings distributed around a central axis of the ring to receive said blades, and a plurality of backup retaining members connected to the rotor element, passing radially through the ring through openings in said ring, and each having at least one bearing surface opposite an exterior surface of the ring with a radial spacing.

In the event of fracture or outward radial deformation of the polygonal ring, the exterior surface of the ring will contact said bearing surface and the backup retaining member will take up the radial force, thus ensuring at least retention of the ring and thus limiting the potential damage caused by such failure.

Each backup retaining member more particularly includes an enlarged head with a bearing surface on each side of said opening.

Each backup retaining member advantageously includes a base, for example of dovetail shape, positively interengaged with a complementary groove on the rotor element. Thus the retaining member is retained radially in a simple and effective manner.

Said base may also include at least one orifice receiving a bolt for limiting movement of the base relative to the rotor element in the direction of said groove. In another embodiment, an annular stop ring is disposed between the base and the rotor element to limit movement of the base relative to the rotor member in the direction of said groove.

BRIEF DESCRIPTION OF THE SEVERAL VIEWS OF THE DRAWINGS

Details of the invention are described hereinafter with reference to the drawings.

DETAILED DESCRIPTION OF THE INVENTION

Figure 1:
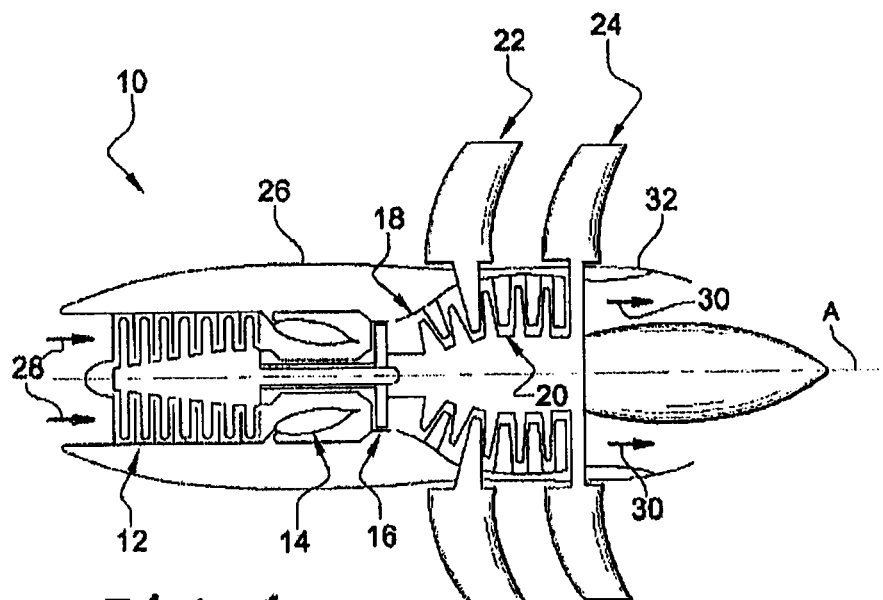
FIG. 1 shows a turbomachine of the unducted fan type.

Refer first to FIG. 1, which shows an unducted fan (or open rotor) turbomachine 10 that includes, in the upstream to downstream direction, in the direction of flow of the gases inside the turbomachine, a compressor 12, an annular combustion chamber 14, a high-pressure turbine 16, and two low-pressure turbines 18, 20 that contrarotate, i.e. that turn in opposite directions about the longitudinal axis A of the turbomachine.

Each of these downstream turbines 18, 20 is constrained to rotate with an external propeller 22, 24 extending radially outside the nacelle 26 of the turbomachine. This nacelle 26 is substantially cylindrical and extends along the axis A around the compressor 12, the combustion chamber 14, and the turbines 16, 18 and 20.

The airflow 28 that enters the turbomachine is compressed and then mixed with fuel and burned in the combustion chamber 14, the combustion gases then passing through the turbines to drive rotation of the propellers 22, 24 that supply most of the thrust generated by the turbomachine. The combustion gases leaving the turbines are expelled via a nozzle 32 (arrows 30) to increase the thrust.

The propellers 22, 24 are disposed coaxially one behind the other and include a plurality of blades regularly distributed around the axis A of the turbomachine. These blades extend substantially radially and are of the variable pitch type, i.e. they may turn about their axes to optimize their angular position as a function of the operating conditions of the turbomachine.

Figure 2:
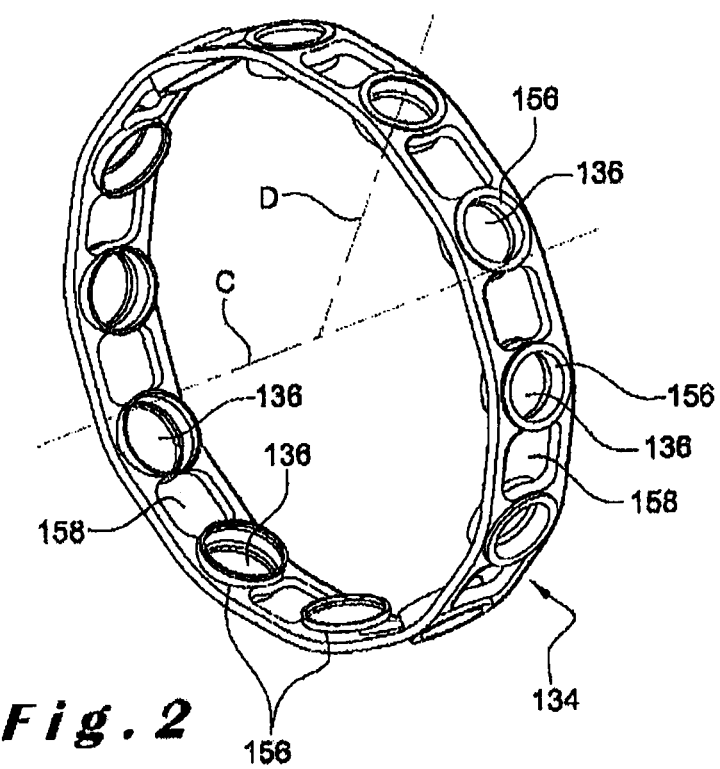
FIG. 2 is a perspective view of a polygonal retaining ring for the unducted propeller blades of a propeller hub of one embodiment of the invention.

Each propeller comprises a polygonal ring that extends around the axis A and that includes a plurality of substantially cylindrical radial housings in which are engaged mounting means for the blades of the propeller. A polygonal ring 134 of this kind is shown in FIG. 2. It comprises substantially radial cylindrical housings 136 having cylindrical walls 156 and a plurality of openings 158 regularly distributed around the central axis C of the ring and formed in the ring to lighten it. Each opening 158 is situated between two consecutive radial housings 136.

However, a polygonal ring 134 of this kind forms a critical failure point for the turbomachine. In the event of fracture of the polygonal ring 134 or its connection with the turbine, the propeller blades could escape and, propelled by centrifugal forces, cause very severe damage around the turbomachine. Measures must therefore be taken to prevent this risk.

Figure 3:
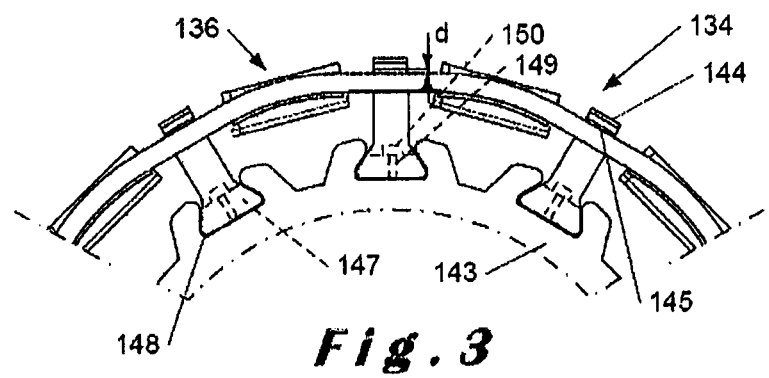
FIG. 3 is a front view of the polygonal ring from FIG. 2 with a plurality of backup retaining members.

A propeller hub of a first embodiment of the invention is shown in FIG. 3. In this propeller hub, the ring 134 is fixed to a turbine rotor element 143 by means that are not shown. To ensure retention of the ring 134 or of detached segments thereof in the event of fracture of the ring or of these fixing means, a plurality of backup retaining members 144 distributed around the circumference of the ring 134 are also fixed to the rotor element 143 and pass radially through the ring 134 through the openings 158 to offer bearing surfaces 145 opposite exterior surfaces 146 of the ring 134 with a radial spacing d.

Figure 4:
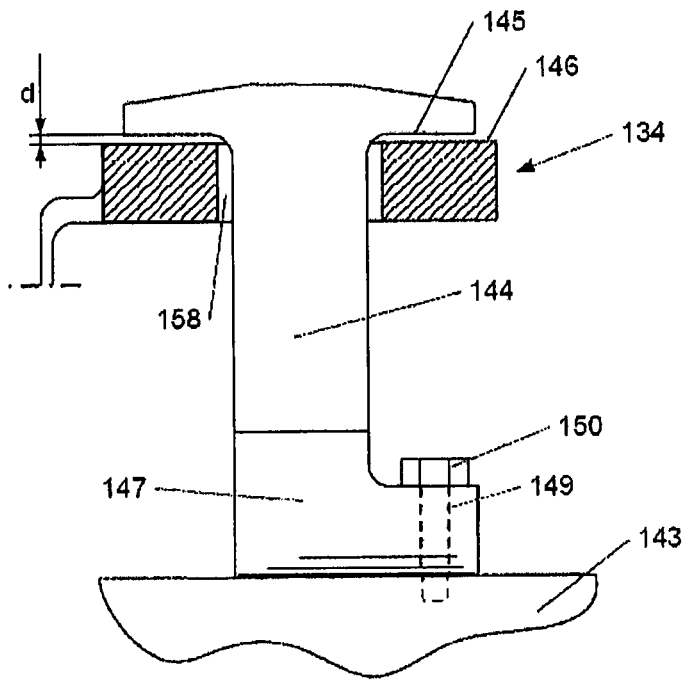
FIG. 4 is a sectional view taken along the line IV-IV in FIG. 3.

It is seen in FIG. 4 that the backup retaining member 144 has a head that is enlarged in a direction parallel to the axis C so as to have a bearing surface 145 of this kind facing the exterior surfaces 146 of the ring 134 on each side of the opening 158.

At its base, each backup retaining member 144 includes a dovetail-shape base 147. This dovetail-shape base 147 is positively interengaged with a complementary groove 148 on the rotor element 143 to retain the member 144 radially. In the embodiment shown, the groove 148 is oriented in a direction parallel to the axis C. However, other orientations perpendicular to said radial direction could be envisaged depending on circumstances and space constraints imposed by assembly and disassembly of the turbomachine. For example, the groove could be oriented tangentially to a circumference centered on the axis C.

The base 147 also includes at least one orifice 149 for receiving a bolt 150 for limiting or preventing movement of the base 147 relative to the rotor element in the direction of the groove 148. In another embodiment which is not shown an annular stop ring is provided between the base (147) and the rotor element (143) to limit movement of the base (147) relative to the rotor element (143) in the direction of said groove (148).

In normal operation, as the bearing surfaces 145 have a radial spacing d relative to the exterior surfaces 146 of the ring 134, no force is transmitted from the ring 134 to the rotor element 143 via the backup retaining members 144. All forces are transmitted from the ring 134 to the rotor element 143 by these normal fixing means. However, in the event of fracture or significant radial deformation of the ring 134 and/or the means fixing it to the rotor element 143, exterior surfaces 146 of the ring 134 contact the bearing surfaces 145 of the backup retaining members 144, which take up at least some of the radial retention forces of at least a section of the ring 134. In this way, the backup retaining members 144 offer an additional safety measure against fracture of the propeller hub of the invention.

Although the present invention has been described with reference to specific embodiments, it is obvious that various modifications and changes may be made to these examples without departing from the general scope of the invention as defined by the claims. Consequently, the description and the drawings must be considered in an illustrative sense rather than a restrictive sense.

The invention claimed is:

1. A propeller hub for a turbomachine with variable pitch blades, comprising:
    a turbomachine turbine rotor element;
    a polygonal ring fixed to the rotor element and including substantially radial cylindrical housings distributed around a central axis of the ring to receive the blades; and
    a plurality of backup retaining members connected to the rotor element, each passing radially through the ring through a respective opening in the ring and each backup retaining member including at least one bearing surface opposite an exterior surface of the ring with a radial spacing between the at least one bearing surface and the exterior surface of the ring.

2. The hub as claimed in claim 1, wherein each backup retaining member includes an enlarged head with a bearing surface on each side of the respective opening.

3. The hub as claimed in claim 1, wherein each backup retaining member includes a dovetail-shape base positively interengaged with a respective complementary groove on the rotor element.

4. The hub as claimed in claim 3, wherein the base also includes at least one orifice receiving a bolt for limiting movement of the base relative to the rotor element in the direction of the groove.

5. A propeller including a hub according to claim 1 and blades received in the cylindrical housings.

6. A turbomachine including a propeller as claimed in claim 5.

7. A turbomachine including two contrarotating propellers as claimed in claim 5.

* * * * *